United States Patent

[11] 3,616,904

| [72] | Inventor | Toivo Ensio Aremaa<br>Karhula, Finland |
|---|---|---|
| [21] | Appl. No. | 753,797 |
| [22] | Filed | June 11, 1968 |
| [45] | Patented | Nov. 2, 1971 |
| [73] | Assignee | A. Ahlstrom Osakeyhtio<br>Noormarkku, Finland<br>Continuation-in-part of application Ser. No.<br>360,891, Apr. 20, 1964, now abandoned. |

[54] APPARATUS FOR TREATING DISCRETE MATERIALS
2 Claims, 4 Drawing Figs.

[52] U.S. Cl. .................................................. 209/269,
209/273, 209/346, 209/367, 209/284, 209/300,
209/275, 209/380
[51] Int. Cl. .................................................. B07b 1/28
[50] Field of Search .......................................... 209/268,
269, 273, 270, 275-278, 302, 346, 347, 367

[56] References Cited
UNITED STATES PATENTS

| 806,640 | 12/1905 | Chapman | 209/287 X |
|---|---|---|---|
| 1,685,621 | 9/1928 | Allen | 209/269 X |
| 1,886,174 | 11/1932 | Flint et al. | 209/269 |
| 2,462,878 | 3/1949 | Logue | 209/269 X |
| 2,563,249 | 8/1951 | Koziol | 209/269 X |
| 2,653,521 | 9/1953 | Ahlfors | 209/287 X |
| 2,804,975 | 9/1957 | Liebhart et al. | 209/270 X |
| 2,880,870 | 4/1959 | Colin | 209/269 |
| 2,942,730 | 6/1960 | Fontein | 209/273 X |
| 3,009,576 | 11/1961 | Jones | 209/268 |
| 3,024,911 | 3/1962 | Janson | 209/268 |
| 3,045,823 | 7/1962 | Fontein | 209/273 |
| 3,376,976 | 4/1968 | Wallen | 209/273 |
| 3,394,809 | 7/1968 | Hunter | 209/273 |
| 3,400,820 | 9/1968 | Nelson | 209/273 |
| 1,479,834 | 1/1924 | Reynolds | 209/347 |
| 2,607,490 | 8/1952 | Newton | 209/270 |
| 3,782,927 | 2/1957 | Derrick, Jr. | 209/302 X |
| 3,049,235 | 8/1962 | Newburg | 209/346 |
| 3,409,125 | 11/1968 | Bezemer et al. | 209/273 X |

FOREIGN PATENTS

| 1,264,698 | 5/1961 | France | 209/275 |

OTHER REFERENCES

Kleinlein et al., German Printed Application, No. 1,013,224, 4-54, 209-287.

Primary Examiner—Tim R. Miles
Attorney—Albert M. Parker

ABSTRACT: Apparatus for treating particulate material. Particles fed into a closed vessel are screened through a filter vibrating at a high frequency in a plane deviating substantially from the plane of the filter surface. Since the system is closed, a controlled overpressure can be maintained on the input side of the filter to drive particles through the filter. Different outlets are provided for material which passes through the filter and material which does not.

INVENTOR
TOIVO ENSIO AREMAA
ATTORNEY.

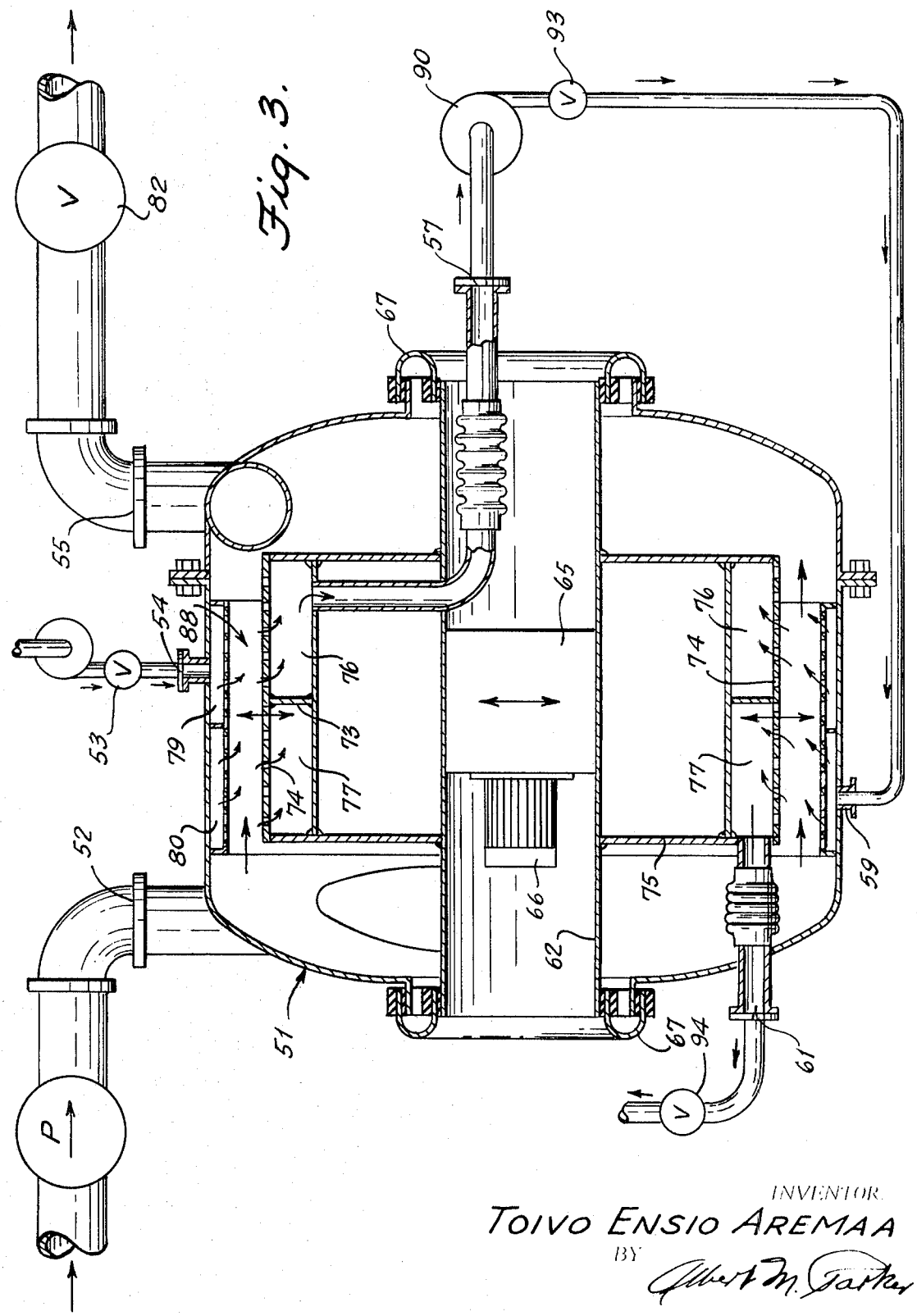

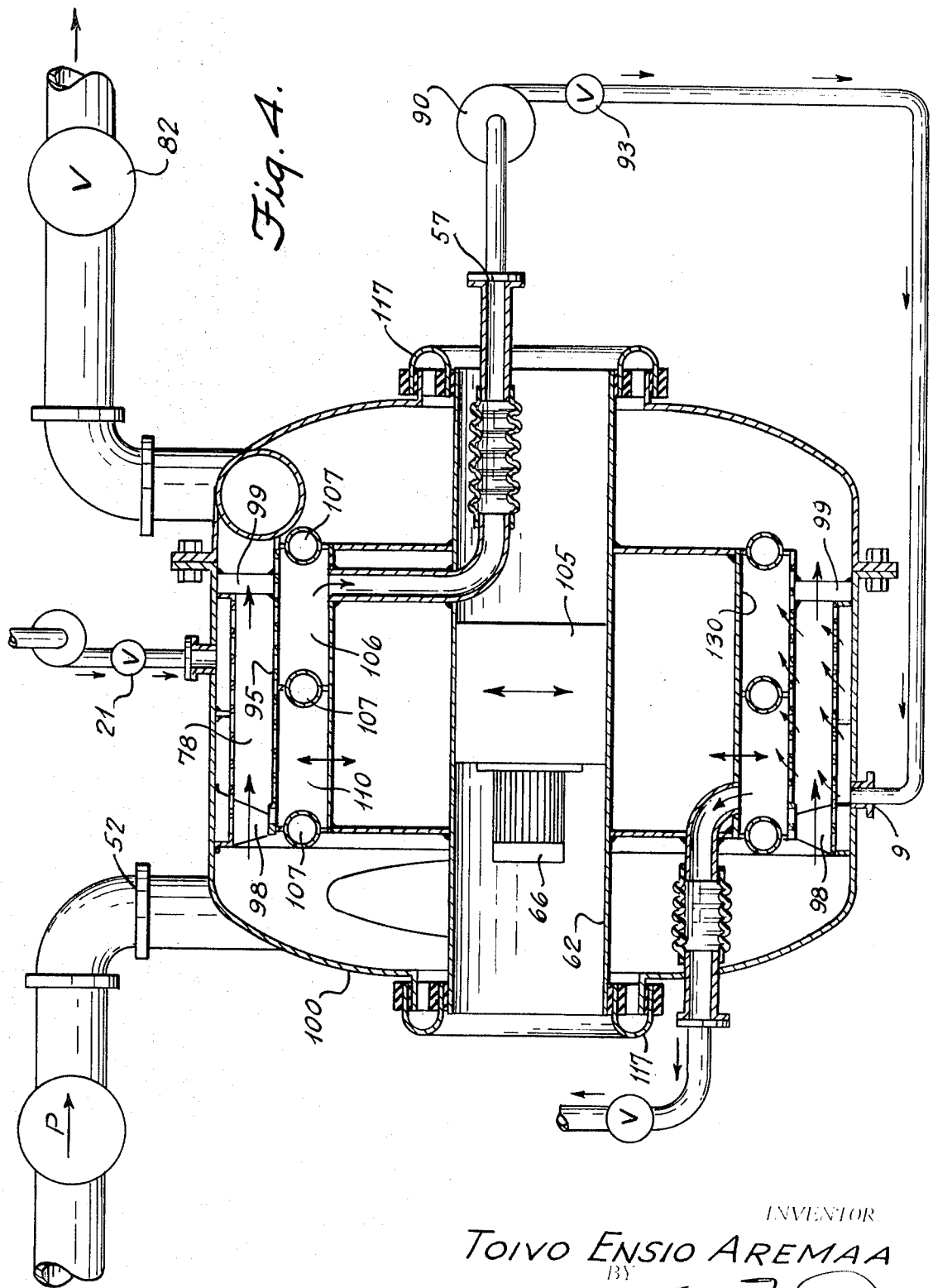

APPARATUS FOR TREATING DISCRETE MATERIALS

CROSS-REFERENCE TO RELATED APPLICATION

This application is a continuation-in-part of copending application Ser. No. 360,891, filed Apr. 20, 1964, now abandoned, for METHOD AND APPARATUS FOR TREATMENT OF MATERIALS IN TANKS AND CHANNELS EQUIPPED WITH VIBRATED SCREEN OR FILTER SURFACES.

BACKGROUND OF THE INVENTION

1. Field of the Invention

This invention relates to apparatus for sorting, filtering, washing, drying or otherwise treating materials comprising solid particles mixed with gases or liquids which can be pumped or blown through pipes or other conduits.

2. Description of the Prior Art

Screen or filter surfaces are used quite commonly for treating different materials in various ways. One example is the screening of fibrous pulp slurries. Heretofore suspended particles have been washed by means of drum filters, in which a filter drum rotates in an open trough partially immersed in a suspension of the particles. Wash water is directed onto the surface of the material deposited on the periphery of the drum.

When this method is used, the wash water passes through the layer of particles on the drum only by the effect of gravity or a hydrostatic pressure differential. Also a pressure differential may be achieved by reducing the pressure on one side of the open drum. To make the capacity of the washer great with respect to its size, a high pressure differential should exist between the opposite sides of the filter surface. This is not possible unless the container is closed and is pressure resistant. Drum filters of open construction have the further disadvantage that air can be mixed with both the material to be washed and the separated liquid, which may cause foaming or other problems.

It has been the practice, in some instances in the past, to vibrate screens at a relatively high frequency in vessels of open construction to separate solid particles from a fluid, but not to do so in closed containers under high pressure. Also, separating of particles from a fluid, has been done in some instances by vibrating an entire open container while performing a screening operation.

This invention relates to apparatus for treating materials under pressure in a closed tank or a channel, and having a screen or filter surface. Relative high-frequency vibratory motion is effected between the screen or filter surface and the material to be treated in a plane which deviates considerably from the plane of the screen or filter surface. This vibratory motion causes the particles of material which adhere to the screen or filter surface to detach themselves from the surface.

Apparatus embodying the invention may be used for continuous filtering, thickening, screening or classifying of slurries, for filtering liquids, air or gases, for filtering, washing or dewatering of slurries or pulp, for drying moist materials in granular form, or for similar treatment of various materials in closed containers, tanks, or channels.

Materials to be treated in accordance with this invention may comprise discrete particles of solid material which are mixed with a fluid, i.e., with a liquid or a gas, and which are to be divided into fractions consisting of particles of different sizes, weights or characteristics. The mixture should be of such consistency that it may be pumped or blown through pipes or other conduits.

In accordance with the invention, continuous washing, drying, separating and similar treatments of particles suspended in a fluid are carried out in a pressurized container provided with one or more screen or filter surfaces. Relative vibratory motion is effected between the screen or filter surfaces and the particles. Usually these surfaces are vibrated in a plane which is either perpendicular to those surfaces, or which deviates substantially from the plane of the surface, and with respect to particles to be washed. For example, the plane in which the filter surfaces vibrate may be displaced from the plane of the filter surfaces by from about 45° to about 90°. This action causes the particles which adhere to the screen or filter surfaces to be loosened and be freed from those surfaces. This vibratory action prevents blockage of the filter surfaces, and also may assist in conveying coarse material along or around the screen surfaces and toward a discharge opening. The construction and operation of apparatus embodying the invention will be apparent from the following detailed description and the accompanying drawings.

FIG. 3 is a vertical section of another form of apparatus for washing particles having an annular flow channel, a cylindrical filter element and vibrating means; and FIG. 4 is an axial section of still another apparatus for washing particles and having an annular channel to guide particles to be washed, a cylindrical filter and vibrating means.

Figure 1:
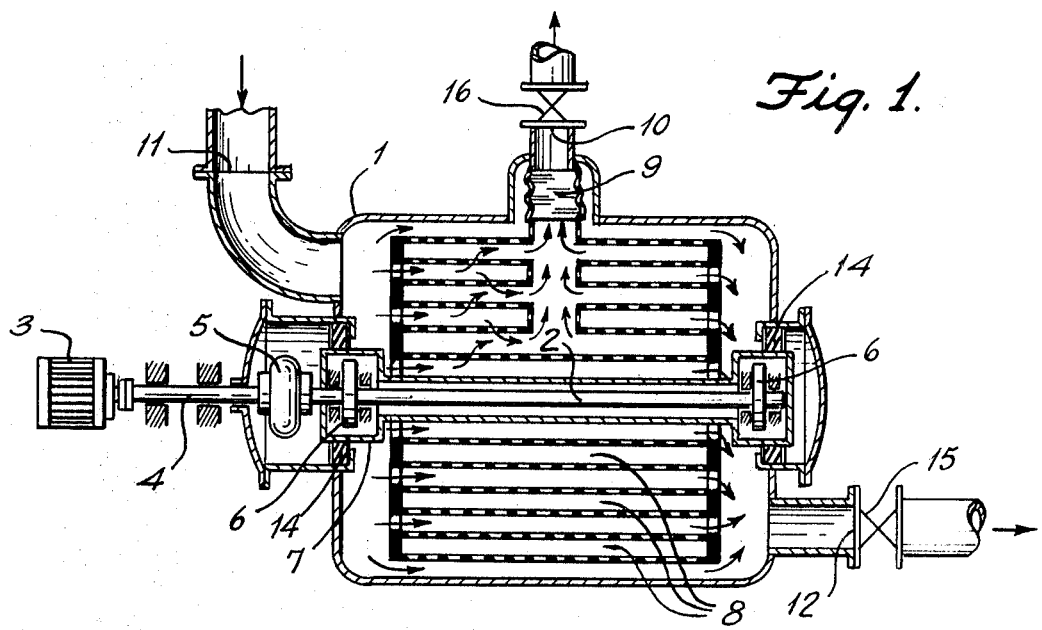
FIG. 1 is an axial, longitudinal section of an apparatus comprising one embodiment of the invention.

Referring to FIG. 1, the apparatus shown therein acts as an effluent filter. A vibrating shaft 2 is arranged at the center of a closed tank 1. The vibrating shaft 2 is driven by a motor 3 through an intermediate shaft 4 and an elastic coupling 5, which permits the shaft 2 to vibrate in the perpendicular direction. The vibrating shaft 2 is provided with eccentrically weighted discs 6 and the necessary bearings, all positioned in a housing 7 which is supported by two rubber rings 14.

Three cylindrical filter elements 8, arranged one within the other, are secured to the housing 7. Each of the cylindrical elements has radially spaced, cylindrical walls, as shown. The inner and outer surfaces of the filter elements 8 are made of filter cloth and the ends of the filter elements 8 are closed by parallel, annular members. The filter elements 8 are connected to an opening 10, which is provided with a control valve 16, and a bellows compensator 9. The tank 1 has a feed opening 11 and a discharge opening 12. The discharge opening 12 is provided with a control valve 15 for discharging the fraction of the liquid which contains the filtered particles, such as dirt and fibers.

The rate of rotation of the vibrating shaft 2 may be varied according to the type of material being treated and may fall within the range of about 1,200 r.p.m. to about 3,000 r.p.m. Rates of rotation of the shaft 2 which have proved to be satisfactory are 1,400 r.p.m. and 2,900 r.p.m. The vibratory movement of the filter element is circular, and the diameter of the circle is from about 0.5. mm. to about 7 mm. When the rate of rotation of the shaft 2 is either 1,400 r.p.m. or 2,900 r.p.m. this vibrating movement serves to clean the filter surfaces either 1,400 or 2,900 times per minute, depending on which of these two rates of rotation is chosen.

The fraction containing the particles filtered away from the water is discharged at a suitable flow rate through the discharge opening 12, controlled by means of a valve 15. Likewise the filtered water is discharged through the opening 10 controlled by a valve 16 in such a manner as to keep the tank 1 constantly filled with water and to discharge the separated particles without permitting too much unfiltered water to escape with these particles.

One way to control the discharge rates is to utilize back pressure. The feeding pressure at the opening 11 is greater than the discharge pressure at the openings 10 and 12, so that the separated particles detached from the filter surface are forced to pass towards the discharge openings essentially by the pressure differential.

By virtue of the vibration of the filter or screen surfaces, blockage of these surfaces is avoided. Also, the plane, or direction, of the vibrations can be selected so that the vibrational strokes tend to advance any coarse fractions around the screen drum. This prevents the coarse fractions from traveling directly to one end of the drum and causes the coarse fraction to remain longer in the treating region while traveling around the drum. This is advantageous because the finer material is thereby separated more completely from the coarse material.

Figure 2:
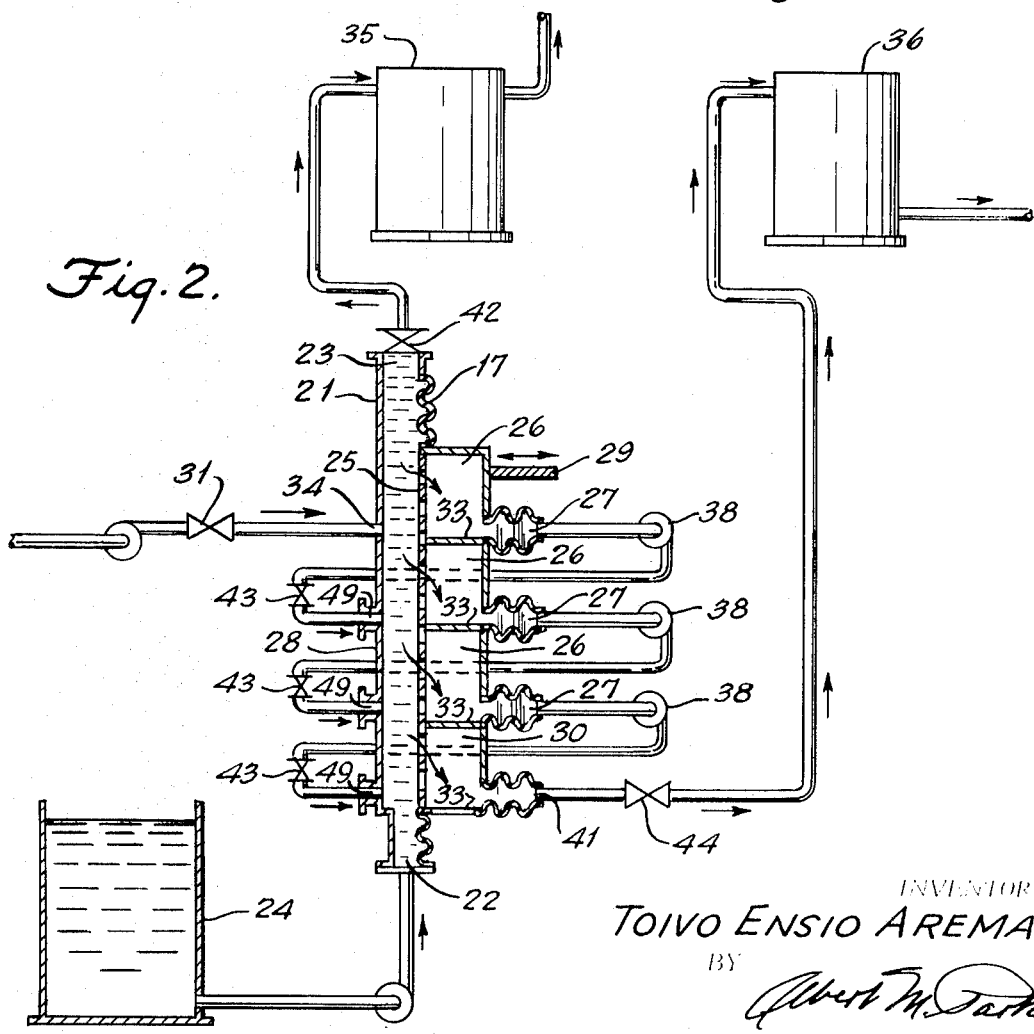
FIG. 2 is a schematic, vertical section showing another system embodying the invention designed for washing particles and having a plurality of vertical material-treating zones, vibrating means and fluid-conveying lines.

FIGS. 2, 3, and 4 illustrate schematically three other designs of apparatus for washing particulate material, such as kraft pulp. Referring to FIG. 2, there is shown an apparatus comprising a pressure-resistant container 21, wherein is provided a planar filter surface 25 forming a vertical, preferably flat, flow channel 28 for the pulp to be washed. The filter surface 25 is vibrated by means of an electrically driven, or other suitable, vibrating means in a plane deviating substantially, e.g. from about 45° to about 90°, from the plane of the filter surface. The stroke length of the vibrations thus produced may be, for example, 1/10 inch and the frequency may be about 1,200 cycles per minute. Vibrating means similar to that shown in FIG. 3, and described in connection therewith, may be used to vibrate the filter surface 25.

The liquor-containing pulp suspension is pumped to the apparatus under pressure from a container 24 through a bottom inlet 22. The pulp moves upward toward an outlet 23 by the effect of the pressure differential between the fluids at the pulp inlet and the pulp outlet. The washed pulp is passed, by means of its overpressure, to a sorting apparatus 35 disposed at a higher level, and its flow rate is controlled by means of a valve 42.

The space for the filtrate liquor is divided by partition walls 33 into three upper compartments 26 and a fourth bottom compartment 30. The three upper compartments 26 communicate through openings 27 with liquor pumps 38. The filtrate liquor is returned from each of the pumps 38 to the respective adjacent lower compartment through control valves 43 and inlets 49. Wash water is introduced at the uppermost zone through an inlet 34 and a valve 31 connected to the flow channel.

The pulp washing is thus performed in four stages in a direction transverse with respect to the upward-moving pulp layer. The successive washing steps are carried out according to the countercurrent principle with respect to the direction of pulp movement, so that fresh water is utilized for washing only the the uppermost zone. With this arrangement, the pulp will be washed thoroughly even though only a small quantity of wash water is used. Consequently, the dry content of the liquor discharged from the washer through outlet 41 is maintained at a high level.

The separated liquor is passed by means of its overpressure to a tank 36 disposed at a higher level than, or far removed from, the washer, e.g. in the evaporating room, where the liquor is to be conveyed. To permit both the washed pulp and the separated liquor to be conveyed further by means of their respective overpressures, the upper portion of the washer is maintained, by means of valves 42 and 44, at a sufficient overpressure, e.g. in the range of 14 to 40 p.s.i.

The washing process, as well as the consistency of the pulp at different portions of the flow channel, can be controlled by means of valves 43. The side element, which consists of the filter surface 25 and the compartments 26 and 30, is vibrated by any suitable vibrating means. This side element is joined to the container 21 by means of elastic sealing elements 27 and 17.

The apparatus shown in FIG. 3 serves as a washer for pulp, or the like, and comprises a container 51 designed to resist an overpressure of above 50 p.s.i. The container has a tangentially disposed pulp inlet 52, a wash water valve 53, a wash water inlet 54, a tangentially disposed outlet 55 for the washed pulp, and outlet 57 for filtrate, an inlet 59 for returning the filtrate into the container and an outlet 61 for the separated liquor.

A tube 62 extends through the container, and its opposite ends are joined elastically and sealed to the ends of the container by means of rubber rings 67. Within the tube 62 there is provided a vibrator 65 to which a motor 66 is connected. The motor 66 rotates a shaft (not shown) mounted on the vibrator 65 and the shaft has an eccentric body mounted thereon which creates the necessary vibrations.

A filter drum 75 and annular washing liquor feeding compartments 79 and 80 are provided within the container and are disposed so as to form am annular flow channel 88 for the pulp to be washed. The filter drum 75 is attached to the central tube 62, and it is vibrated by means of the vibrator 65 in a plane perpendicular with respect to the longitudinal axis of the filter drum. The peripheral surface of the filter drum 75 is provided with a tubular screening means, such as a perforated screen plate or a wire cloth, 74.

The inside portion of the filter drum 75 is divided by means of a partition wall 73 into two successive compartments 76, and 77, communicating through the elastic rubber pipes with their respective outlets 57 and 61.

The filter drum 75 can alternately be conical, so that its diameter increases in the pulp flow direction. In that case the vibration not only would loosen the pulp thickened onto the drum surface but would also convey the pulp toward an outlet 55.

Washing of the pulp takes place in this apparatus in the following manner:

The apparatus is placed in the mill, preferable on the lowest floor in the desired position, and pulp to be washed is pumped continuously through the apparatus at a pressure of about 20–35 p.s.i., then through a pressure separator and further to a pulp container. The pulp-containing liquor to be washed is pumped into the apparatus through the inlet 52 and into a flow channel 88, in which the washing takes place in two stages. Wash water is introduced at the desired pressure through a valve 53, an inlet 54 and a compartment 79 onto the pulp on the screen surface 74.

The water displaces the liquor in the pulp through the filter surface into a compartment 76. The liquor, mixed with a portion of the washing water, is discharged through an outlet 57. The liquor emerging from outlet 57 is pumped by means of pump 90 through an inlet 59 to a compartment 80 wherefrom it flows as washing liquor onto the pulp on the screen surface in the initial portion of a flow channel 88. The wash liquor displaces the liquor in the pulp through the filter surface into a compartment 77 and out of the apparatus through an outlet 61. In order to avoid adherence of the pulp to the filter surface 75, that surface is vibrated by means of the vibrator 65.

The quantity of pulp flowing through the washer is controlled by means of a valve 82. The wash water flow is adjusted to a suitable value by means of the valve 53 and the flow rate of the separated liquor is controlled by means of the valves 93 and 94. The valves 93 and 94 also may be utilized to control the pulp consistency in the flow channel 88.

If the pulp to be washed will not otherwise properly pass through the apparatus, the apparatus can further be provided with movable scraper vanes. Whenever this filter surface tends to become blocked, the filter surface may be cleaned by passing water through the openings 57 and 61 into the compartments 75 and 76.

The apparatus shown in FIG. 4 is similar to that shown in FIG. 3 and it also serves as a washer for pulp. The construction of this apparatus differs from that shown in FIG. 3 in the following manner:

In this apparatus a filter surface 95, which may comprise a perforated screen plate or a wire cloth, is fixedly supported by means of support elements 98 and 99 on the peripheral wall of a container 100. A drum 103 reciprocated by a vibrator 105 is joined elastically by means of rubber rings 107 to the filter surface 95 so that annular compartments 106 and 110 are formed for containing the liquor. Otherwise the construction of the apparatus is similar to that of the apparatus shown in FIG. 3.

The washing of pulp takes place in this apparatus in substantially the same manner as with the apparatus shown in FIG. 3. However, in the apparatus shown in FIG. 4, the filter surface is stationary, and the pulp to be washed is brought into reciprocating movement with respect to the filter surface 95 by means of the vibrating drum 105. By virtue of this vibratory movement, the pulp adhering to the filter surface 95 is loosened and will not block the flow channel.

Since the pulp washed by means of this apparatus is vibrated in a closed space during the treatment, the liquor and washing water contained in the stock are brought into a reciprocatory movement with respect to the pulp fibers. As a result, the liquor is separated from the pulp rapidly and substantially completely. In prior known apparatuses of open construction, such a powerful treatment is not possible.

Various types of apparatus embodying the invention can be utilized for many different purposes, and the construction, size, position and shape of the apparatus can be varied according to requirements. For example, the screen or filter surfaces can be provided with openings of different sizes and shapes, such as slots or circular holes, also those surfaces can be arranged to allow simultaneous production of different fractions, depending on the openings used.

Apparatus of the types described hereinabove can be adapted to treat particles in only one stage or in several stages. The wash water, or other treatment medium, can be passed either in a substantially transverse direction or countercurrent with respect to the direction of movement of the particle being treated. Instead of wash water, the treating medium may consist of a bleaching or other solution, air, or a gas. When air or a gas is used, the particles being treated may also be dried in this apparatus. Also the apparatus can be utilized for separating a hot liquor from a suspension, utilizing a cold liquor as a treatment medium.

The container forming a part of the apparatus may include means for the transfer, or movement, within the container of the particles being treated therein. One such means might be a conveyor similar to a forming wire of a paper-making machine. Thus, the filter surfaces of the apparatus could, in addition to its vibratory movement, be arranged to move in the direction of movement of the material particles being treated. Such movement might serve to prevent blockage of the apparatus.

In the case of dry treatment, the sorting of such as powder formed material is carried out in the following manner:

A mixture of said material and air is blown through the apparatus. The coarse fraction is passed by means of its pressure without a separate blower through another similar separator and a subsequent grinder. The fine fraction also is passed by means of its pressure from the separator to other treatment apparatuses. To make such onward conveying and a closed process possible, the material mixture must be blown into the separator at a much greater pressure than the pressure required for the sorting. In determining the suitable inlet pressure the flow resistances in the entire treating system must be considered. If the outlet pressure of one of the fractions, such as the fine fraction, cannot be utilized, the discharge of that fraction is rationed or throttled in order to maintain the pressure in the container sufficiently high for conveying the coarse fraction through the second separator and the grinder situated at the same level or higher. The container of the separator must therefore be constructed to resist a much greater pressure than required by the separation only.

Gravity utilization is not generally adhered to in this treatment method, so that the separator and its screen surfaces can be disposed in any position. Neither is the configuration of the screen surfaces of any particular importance, and the separator should not be placed above tanks or other apparatus in the manner of separators of open construction, but should preferably be placed in the undermost portion of the building. The flow of material through the separator must not be controlled in the feed line but in order to maintain constant treatment pressure the quantity control must be carried out in the outlet lines of the various fractions, preferably after the additional apparatuses, at the discharge end of the treating system, in which case a smaller number of control devices is required.

Utilization of a closed treatment system provides several advantages, for instance, escaping of the fine fraction as dust between the various apparatuses is avoided, intermediate containers with their emptying means are not required nor are a plurality of blowers or other transfer means, the transfer distances are decreased and the supervision of the entire treatment system is simplified.

When treating a suspension the material is pumped through the apparatus so that the outlet pressure of the coarse fraction is in the range of about 25 to 50 p.s.i. and that of the fine fraction, due to the pressure loss, is in the range of about 20 to 45 p.s.i. The container included in the apparatus must therefore be designed to resist such pressures. Otherwise the sorting or filtering of suspensions is carried out similarly to the treatment of dry material.

I claim:

1. Apparatus for treating particle-carrying liquors, such as pulp slurries and the like, which comprises a closed treating vessel, means for introducing such a liquor into a vessel under pressure, a screen positioned within the vessel and having a filter surface so disposed that liquor introduced into the vessel engages the filter surface, and vibrating means for effecting relative vibratory motion between the filter surface and the liquor within the vessel, whereby the particles are caused to alternately engage and disengage the filter surface, the liquor passed through the screen and the particles are thus separated from the liquor, means for introducing wash water into the vessel, individual outlets for discharging the separated particles and fluid materials from the vessel, including a first outlet for liquor under pressure passed through the screen and a second outlet for separated particles under pressure, and means for controlling the respective rates of flow of the materials discharged through the outlets.

2. Apparatus as claimed in claim 1, wherein the vibrating means vibrates the filter surface at a frequency of at least 1,200 cycles per minute.